United States Patent
Voth et al.

(10) Patent No.: US 9,616,609 B2
(45) Date of Patent: Apr. 11, 2017

(54) STERILE BLOW MOULDING MACHINE WITH NON-STERILE MEDIA SUPPLY

(75) Inventors: Klaus Voth, Obertraubling (DE); Juergen Soellner, Beratzhausen (DE)

(73) Assignee: KRONES AG, Neutraubling (DE)

( * ) Notice: Subject to any disclaimer, the term of this patent is extended or adjusted under 35 U.S.C. 154(b) by 1207 days.

(21) Appl. No.: 13/409,802

(22) Filed: Mar. 1, 2012

(65) Prior Publication Data

US 2012/0223465 A1 Sep. 6, 2012

(30) Foreign Application Priority Data

Mar. 4, 2011 (DE) .................. 10 2011 013 124

(51) Int. Cl.
*B29C 49/00* (2006.01)
*B29C 49/56* (2006.01)
*B29C 49/46* (2006.01)

(52) U.S. Cl.
CPC .............. *B29C 49/56* (2013.01); *B29C 49/46* (2013.01); *B29C 2049/4679* (2013.01); *B29C 2049/4697* (2013.01)

(58) Field of Classification Search
CPC ......... B29C 49/00; B29C 49/28; B29C 49/46; B29C 49/30; B29C 2049/4697; B29C 2049/4673
USPC ........................................ 425/522, 535, 538
See application file for complete search history.

(56) References Cited

U.S. PATENT DOCUMENTS

| 6,733,272 | B1 | 5/2004 | Derouault et al. |
| 7,862,327 | B2 | 1/2011 | Rousseau et al. |
| 2011/0037187 | A1* | 2/2011 | Winzinger et al. ............. 264/39 |
| 2011/0133369 | A1* | 6/2011 | Martini et al. ................ 264/523 |

FOREIGN PATENT DOCUMENTS

| DE | 199 44 111 | 3/2001 |
| DE | 601 13 860 | 7/2006 |
| DE | 10 2008 018 785 | 10/2009 |
| DE | 10 2010 022 129.5 | 11/2011 |
| EP | 1 271 029 | 5/2002 |
| EP | 1 312 459 | 5/2003 |
| WO | WO 2010/020529 | 2/2010 |

* cited by examiner

*Primary Examiner* — Christina Johnson
*Assistant Examiner* — Xue Liu
(74) *Attorney, Agent, or Firm* — Greer, Burns & Crain, Ltd.

(57) ABSTRACT

An apparatus for the shaping of plastics material pre-forms into plastics material containers, with a plurality of shaping stations which are arranged on a movable carrier, wherein the shaping stations have blow molds which are used for receiving the plastic pre-forms and inside which the plastic pre-forms are shaped into the plastic containers, and wherein the shaping stations have stressing devices which are movable relative to the plastic pre-forms and which act upon the pre-forms arranged in the blow molds with a sterile flowable medium to expand them, with a clean room, inside which the shaping stations are conveyed, wherein this clean room is arranged or demarcated from the environment by means of at least one wall. At least one supply device is provided for supplying a flowable control medium to at least one shaping station), wherein this supply device (60) is sealed off from the clean room.

18 Claims, 4 Drawing Sheets

STERILE BLOW MOULDING MACHINE WITH NON-STERILE MEDIA SUPPLY

BACKGROUND

The present invention relates to an apparatus for the shaping of plastics material pre-forms into plastics material containers. Apparatus of this type have long been known from the prior art. In this case for example heated plastics material pre-forms can be shaped to form plastics material containers by being acted upon with compressed air. In addition, aseptic blow moulding machines, in which for example plastics material pre-forms microbially cleaned beforehand with a disinfection and/or sterilization agent are expanded with pressure medium to form plastics material containers, are known from the prior art. A sterile shaping device of this type is known from WO 2010 020 529 A2. The subject matter of WO 2010 020 529 A2 is hereby also made the contents of the disclosure of the present application by reference in its entirety.

A sterile gas, which may be air but also other gases, is available in these plants as the pressure medium. The disinfection or sterilization agents used are frequently in the form of oxidative disinfection or sterilization agents. The sterile region in a plant of this type can likewise be decontaminated with disinfection or sterilization agents and the plastics material pre-forms can likewise also be decontaminated in this way.

In an apparatus of this type for the shaping of plastics material pre-forms into plastics material containers, use is made of flowable media, such as for example compressed air, not only for the expansion of the plastics material pre-forms but also for example for other purposes, such as the pneumatic actuation of control pistons in a valve block (as is described for example in EP 1 271 029 B1, the contents of the disclosure of which have likewise been made the contents of the disclosure of the present application by reference) or for the stressing of a pressure pad in a blow mould carrier. In an hygienically optimized and aseptic blow moulding machine it is therefore necessary for the pressure medium to be sterilized.

DE 10 2010 022 129.5 describes an apparatus and a method of cleaning gas in blow moulding machines. In this case components of an aseptic blow moulding machine, which are used for the preparation of the pressure medium, are also described. The contents of the disclosure of this publication have likewise been made the contents of the disclosure of the present application by reference in their entirety.

A method and an apparatus for the blow moulding of containers are known from DE 199 44 111 A1. In this case blow mould segments of a blow moulding station are capable of being stressed relative to one another by the action of a pressure medium upon a pressure application space. This means that for example two blow mould halves are capable of still being stressed with respect to each other in a closed state of these blow moulds. This pressure application space is divided in this case at least into two partial spaces, at least one of the partial spaces being acted upon by the pressure media independently of the further partial spaces.

A blow moulding machine is likewise known from DE 601 13 860 T2, in which an equalization chamber, into which a fluid is injected under pressure in order to spread the mould element from its carrier, is provided in this case between the carrier and a blow moulding element. The equalization chamber is separated here by a diaphragm which comprises a peripheral seal, in which case the diaphragm comes to rest against the mould element.

DE 10 2008 018 785 A1 describes a method and an apparatus for the blow moulding of containers. In this document, blow moulds are likewise retained on a carrier and are stressed pneumatically at least locally with respect to the carrier. In this case the gas for the pneumatic stressing of the blow mould with respect to the carrier is conveyed in the region of the carrier by way of a base which retains the attachment element and which is capable of being positioned jointly with the attachment element.

A blow mould unit is likewise known from U.S. Pat. No. 6,733,272. In this case this unit has pressure medium equalization compensation means which are designed here in the form of flexible pads which are arranged between the carrier and the blow mould.

Nevertheless, this pressure medium preparation is highly complex and, in addition, in the case of an aseptic blow moulding machine it is necessary to ensure that even with the smallest cracks in the seal, such as for example the pressure pad seals, no non-sterile air can penetrate into the sterile zone. In this case this problem can be solved by the incorporation of sensors which detect even the slightest leakages of the seal. The possible solutions, however, are very expensive and prone to breakdown.

SUMMARY

The object of the present invention is therefore to make more inexpensive, particularly in operation, aseptic shaping apparatus which are known from the prior art for the shaping of plastics material pre-forms into plastics material containers.

An apparatus according to the invention for the shaping of plastics material pre-forms into plastics material containers has a plurality of shaping stations which are arranged on a movable carrier. In this case these shaping stations have in each case blow moulds which are used for receiving the plastics material pre-forms and inside which the plastics material pre-forms are capable of being shaped into the plastics material containers. In addition, the shaping stations have in each case stressing devices (also referred to as loading devices or charging devices) which are movable relative to the plastics material pre-forms and which act upon the plastics material pre-forms arranged in the blow moulds with a sterile flowable medium in order to expand them.

In addition, the apparatus has a clean room, inside which the shaping stations or blow moulds respectively are conveyed, this clean room being arranged or demarcated from the environment by at least one wall. It is preferable for this at least one wall therefore to separate the sterile room from the environment.

According to the invention the apparatus has at least one supply device for supplying a flowable control medium to at least one shaping station, which supply device extends at least locally inside the clean room, this supply device being sealed off from the clean room in such a way that the flowable control medium is also capable of being conveyed as a non-sterile medium to the shaping station.

In this case a supply device is to be understood in particular as being a device which supplies the shaping station with a control fluid (which in particular is gaseous) serving to operate the aforesaid shaping station. It is advantageous for each of the shaping stations to have associated with it at least one supply device of this type, which supplies the shaping station in question with the control fluid. The supply device can be for example an air line or an air duct. Control medium or fluid is also to be understood inter alia as being a medium for acting upon the chamber or the air space respectively.

It is therefore proposed that at least one shaping station and preferably all the shaping stations should be supplied not only with sterile blowing air for expanding the plastics material pre-forms, but also with non-sterile control air. At first sight this seems irreconcilable with the requirement of an aseptic blow moulding machine. The Applicants have discovered, however, that by suitable sealing steps it is possible to convey non-sterile media even inside the clean room or the aseptic region. In addition, it is preferable for a detector device which can detect a non-sterile medium or the presence thereof to be provided, in particular inside the clean room.

As a result of this step it is possible to reduce the amount of sterilized medium required, since non-sterile medium is also used for individual partial processes of the shaping process. In this way, the costs of producing sterile gas (expensive per se) can be reduced.

In the case of a further advantageous embodiment the carrier device is a rotatable carrier device or a blow moulding wheel on which the individual shaping stations or blow moulding stations are arranged. The control medium is understood in this case to be a medium which is preferably used not for shaping the plastics material pre-forms into plastics material containers, but for the other processes which are necessary in particular for the shaping process and which are likewise carried out at the shaping stations.

In this case an over-pressure, i.e. a pressure which is higher than the surrounding pressure, can be present in the supply device at least for a time during the working operation.

It is advantageous for the apparatus to have at least one sealing device which prevents the non-sterile medium conveyed into the sterile room by way of the supply device from spreading inside the sterile room in an uncontrolled or uncontrollable manner.

In an advantageous embodiment a chamber which adjoins a region capable of being acted upon with non-sterile medium is arranged inside the clean room. In this way, the supply device can open for example into a pre-set region and the aforesaid chamber adjoins this region. It is advantageous in this case for the chamber or this receiving region respectively to be designed in the form of a chamber with the pressure released. As a result of the provision of this chamber, in particular with the pressure released, an escape of the non-sterile medium into the clean room can be prevented even in the event of leakages, since this non-sterile medium arrives first in the aforesaid chamber. A non-sterile medium which has entered can where appropriate be removed from this chamber in a controlled manner out of the clean room.

In the case of a further advantageous embodiment the chamber is sealed off from the clean room by means of a sealing device. In this way it is made possible for non-sterile medium which has possibly entered the chamber not to be able to enter the clean room, inside which the chamber is situated. It is advantageous for this sealing device to be made resilient. It is particularly advantageous for two walls of the aforesaid chamber to be movable with respect to each other. The resilient sealing device can be for example a folding bellows or even a sterile diaphragm. It is advantageous for the sealing device to be designed to be continuous around the chamber.

In the case of a further advantageous embodiment the apparatus has a removal line for removing a non-sterile control medium from the sterile room. In this way it is possible to remove non-sterile medium again which has penetrated into the sterile room, for example as a result of leaks. In this case it is advantageous for this removal line to be connected in terms of flow to the chamber mentioned above (in particular with the pressure released). It is advantageous for a normal pressure to prevail in the chamber during the working operation of the apparatus, but it would also be possible for the chamber to be acted upon with an under-pressure by way of a removal line, in which case non-sterile medium is capable of being removed out of the clean room through this removal line.

In the case of a further advantageous embodiment a sealing device is arranged between the chamber and the supply device.

In the case of a further advantageous embodiment the individual blow moulds are arranged in blow mould carriers and pressure application spaces capable of being acted upon with the control medium are arranged between the blow moulds and the blow mould carriers. Expressed more precisely, these pressure application spaces can be arranged between the blow mould carrier and a carrier shell, in which case a blow mould part is arranged in turn on this carrier shell. It would be possible for example for the blow moulds (or the carrier shells thereof respectively) to be sealed off from the blow mould carriers, and for the room sealed off accordingly to be capable of being acted upon with the control medium.

The pressure application space can also, however, be formed by a pressure application member which can be for example a cushion which is capable of being acted upon with a medium, in particular a gaseous medium.

In the case of a further advantageous embodiment the apparatus has a valve arrangement for controlling the gaseous sterile medium supplied to the plastics material pre-forms, and this valve arrangement is advantageously acted upon with the flowable non-sterile control medium in order to control the valve arrangement. These valve arrangements, which are also referred to below as a valve block, in this case usually have a plurality of valves which are provided for supplying the individual pressure levels during the expansion procedure of the plastics material pre-forms. In this case it is preferable for these valves to be pneumatically actuated valves, and a non-sterile medium, such as for example non-sterilized air, is preferably used as the control medium for actuating these valves. By means of this procedure it is possible, as mentioned above, for the quantity of gaseous sterile medium required to be reduced. In this case the valve arrangement can be arranged inside the clean room.

The non-sterile pressure medium can be used for example for a pressure pad by the additional chamber with the pressure released, as described above. If this pressure pad seal becomes leaky to a minimum degree, the non-sterile air does not go into the sterile zone but passes directly into the environment, for example through a bore or line. In this way, a secure separation between the non-sterile operative air and the sterile zone is made possible. As has been mentioned, a similar design is also possible for valves with the pressure released in a valve arrangement or a valve block respectively.

In this way it is made possible that the sterile pressure medium has to be used only for the expansion of the plastics material pre-form and that the non-sterile medium is used for actuating the valves and, for example, a pressure pad. In this way, only relatively small flow quantities of air need pass through sterile filters for example, as a result of which a smaller size and/or mass of the sterile filters can be achieved. In addition, the maintenance intervals for the sterile filters can also be extended. Furthermore, a reduction in the cost is possible.

In the case of a further advantageous embodiment the apparatus has a sterilization device for obtaining the sterile flowable medium. This sterilization device can be designed in this case for example in the form of a sterile filter which sterilizes the incoming air.

In this case it would be possible for compressed air first to be removed from a common reservoir, then for this compressed air to be divided in a branch and for a portion of the air to arrive non-sterile at the pressure pad or the valve arrangement for example, while another portion is conveyed through a sterile filter and is finally used for the expansion of the plastics material containers. It is advantageous for flowable media for the expansion of the plastics material pre-forms and, in a particularly preferred manner, also the control medium to be supplied at a pre-set pressure which is preferably between 4 and 40 bar.

In this case it is possible for a media line starting from a reservoir to be divided and for the medium in one branch of this line to be sterilized so as then to expand the plastics material pre-forms. The medium in a second branch of this line can pass non-sterilized to the shaping stations. This division of the media can be carried out in this case for example outside the clean room or even outside the machine. In addition, this division can take place in a stationary part of the machine or in a part of the machine which is movable in working operation. If the machine is for example a rotary machine, the machine can have a rotary distributor for dividing the flowable medium to the individual shaping stations and the division can take place at this rotary distributor.

In the case of a further advantageous embodiment the apparatus also has a reservoir which makes available medium under pressure.

In the case of a further advantageous embodiment the apparatus has a rotary distributor which distributes flowable medium, in particular from a common supply, to a plurality of movable shaping stations.

The present invention further relates to a method of shaping plastics material pre-forms into plastics material containers by means of a plurality of shaping stations, these shaping stations being arranged on a movable carrier and the shaping stations having in each case blow moulds which are used for receiving the plastics material pre-forms and inside which the plastics material pre-forms are shaped into the plastics material containers. In addition, in the shaping stations the plastics material pre-forms arranged in the blow moulds are acted upon with a sterile flowable medium by means of stressing devices movable relative to the plastics material pre-forms in each case in order to expand them, and, in addition, a clean room is provided, inside which the blow moulds or the shaping stations are conveyed. In this case this clean room is sealed off or separated from the environment by means of at least one wall.

According to the invention a non-sterile flowable control medium is supplied at least for a time in the working operation of the apparatus to the shaping stations arranged inside the clean room.

In this case a working operation is understood to be an operation of the apparatus in which the individual plastics material pre-forms are expanded to form plastics material containers. It is therefore proposed that—in particular in order to save sterile medium—a non-sterile medium should also be supplied to the shaping stations, for example in order to actuate a pressure pad (formed for example by an air space) between blow mould carriers and the mould moulds or even in order to actuate the valves of a valve arrangement which controls the supply of the blowing air to the plastics material pre-forms.

It is advantageous for the individual shaping stations to have in each case blow moulds which are arranged at least indirectly on blow mould carriers. In this case for example two blow mould carriers which are movable relative to each other can be provided, in which case parts of the blow moulds are arranged on these two blow mould carriers, so that the blow mould can be opened or closed by a movement of these blow mould carriers. It is advantageous in this case for the opening or closing to be carried out by means of a pivoting movement between the two blow mould carrier parts.

BRIEF DESCRIPTION OF THE DRAWINGS

Further advantages and embodiments are evident from the accompanying drawings. In the drawings

DETAILED DESCRIPTION

Figure 1:
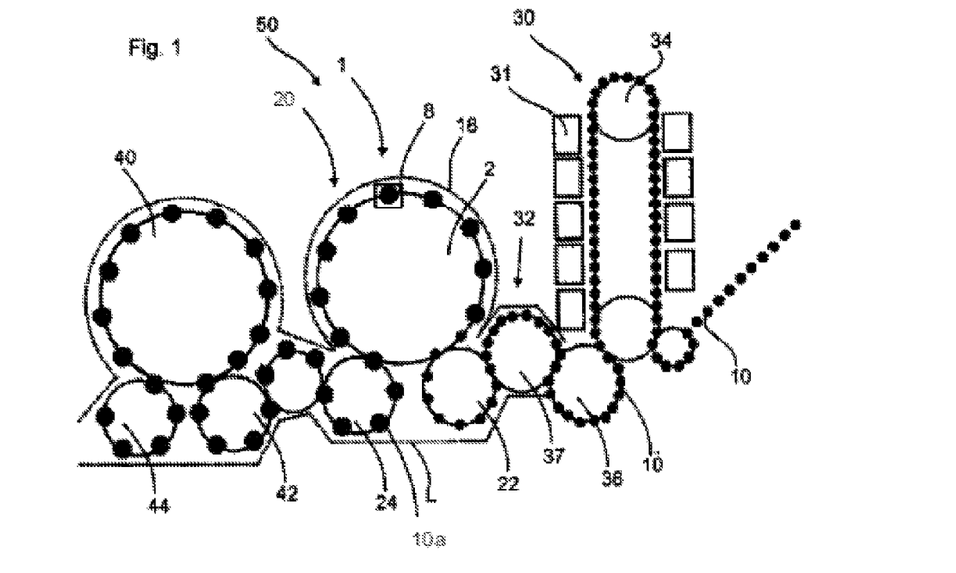
FIG. 1 is a diagrammatic illustration of a plant for producing plastics material containers.

FIG. 1 is a diagrammatic illustration of a plant for producing plastics material containers. This plant 50 has a heating device 30 in which plastics material pre-forms 10 are heated. In this case these plastics material pre-forms 10 are conveyed by means of a conveying device 34, such as a continuous chain here, through this heating device 30 and are heated in this case by a plurality of heating elements 31. This heating device 30 is adjoined by a transfer unit 36 which transfers the pre-forms 10 to a sterilization device 32. This sterilization device 32 likewise has in this case a conveying wheel 37, and sterilization elements can be arranged on this conveying wheel 37 or even in a stationary manner. In this region sterilization by hydrogen peroxide gas or even by electromagnetic radiation for example is possible. In particular, an internal sterilization of the pre-forms is carried out in this region.

The reference number 20 designates a clean room in its entirety, the external boundaries of which are indicated here by the dotted line L. It is evident that this clean room 20 starts in the region of the sterilization unit 32. In this region it is possible for sluice devices to be provided in order to introduce the plastics material pre-forms into the clean room 20 without too much gas being lost inside the clean room during this.

As indicated by the broken line L, the clean room is adapted to the external shape of the individual components of the plant. In this way, the volume of the clean room can be reduced.

The reference number 1 designates a shaping apparatus in its entirety, in which a plurality of blow moulding stations or shaping stations 8 are arranged on a conveying wheel 2, only one of these blow moulding stations 8 being shown here. The plastics material pre-forms 10 are expanded by these blow moulding stations 8 to form containers 10a. Although not shown in detail here, the entire region of the conveying device 2 is not situated inside the clean room 20, but the clean room 20 or isolator is designed to a certain extent in the form of a mini-isolator inside the apparatus as a whole. In this way, it would be possible for the clean room to be designed in the manner of a duct at least in the region of the shaping apparatus 1.

The reference number 22 relates to a supply device which transfers the pre-forms to the shaping device 1 and the reference number 24 relates to a removal device which removes the finished plastics material containers 20 from the shaping apparatus 1. It is evident that in the region of the supply device 22 and the removal device 24 the clean room 20 has recesses in each case which receive these devices 22, 24. In this way, a transfer of the plastics material pre-forms 10 to the shaping apparatus 1 or a transfer of the plastics material containers 10a from the shaping apparatus 1 can be carried out in a particularly advantageous manner.

The expanded plastics material containers are transferred by a transfer unit 42 to a filling device 40 and are then removed from this filling device 40 by way of a further conveying unit 44. In this case the filling device 40 is also situated inside the aforesaid clean room 20. In the case of the filling device too, it would be possible for the entire filling device 40 with for example a reservoir for a beverage not to be arranged completely inside the clean room 20, but in this case too only those regions in which the containers are actually conveyed. In this respect it would also be possible for the filling device to be designed in a similar manner to the apparatus 1 for shaping the plastics material pre-forms 10.

As has been mentioned, the clean room 20 is reduced in the region of the apparatus 1 to a region as small as possible, namely essentially to the blow moulding stations 8 themselves. As a result of this compact design of the clean room 20 it is possible to produce a clean room in an easier and more rapid manner in any case and, in addition, the maintenance of sterile conditions involves less outlay in the operating phase. Less sterile air is also required, and this results in smaller filter plants and the risk of uncontrolled swirl formation is also reduced.

Figure 2:
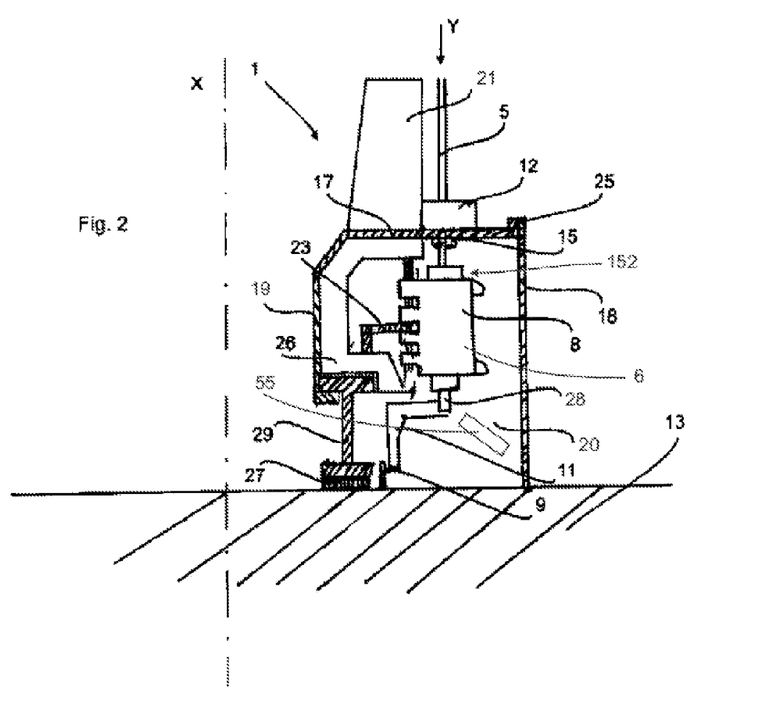
FIG. 2 is a view of a clean room in the region of a shaping station.

FIG. 2 is a detailed illustration of the apparatus 1 in the region of a blow moulding station 8. A plurality of blow moulding stations 8 of this type is moved with a conveying device 2 or a carrier so as to rotate about an axis X. The blow moulding station 8 is, as is evident from FIG. 2, guided inside the clean room 20 which is designed in the form of a duct here. This clean room 20 is closed off by a movable lateral wall 19 and a cover 17 formed in one piece with this lateral wall 19. This lateral wall 19 and the cover 17 in this case turn jointly with the blow moulding station 8.

The reference number 18 relates to a further wall which bounds the clean room 16. This wall 18 is in this case a wall which is situated on the outside and which is arranged in a stationary manner. Between the cover 17 and the wall 18 a sealing device 25 is provided, which seals off from each other the elements 17 and 18 which are movable with respect to each other, for example, as mentioned above, by using a surge chamber. The lower region of the wall 18 is arranged on a base 13 in a fixed and sealed manner. A carrier 26, which likewise moves in a rotating manner and on which is provided in turn a retaining device 23 which holds the blow moulding station 8, is provided inside the clean room 20 and in a manner resting directly against the wall 19 in this case.

The reference number 11 relates to a downstream device which can be actuated by a guide cam 9 in order to open and close the blow moulding station on its path through the clean room 20 and in particular to insert the plastic preform into the blow moulding and also in order to remove it again. In this case a guide cam 9 is also arranged inside the clean room 20. It would also, however, be possible for example to remove a portion 11 below the individual blow moulding stations 8 from the clean room 20.

The conveying device 2 can have still further elements which are arranged above the clean room 20.

The carrier 17 is arranged in this case on a retaining member 29 in a fixed manner and this retaining member in turn is movable with respect to the base 13. In this case the reference number 27 relates to a further sealing device which in this region too forms a seal of the regions 13 and 29 which are movable with respect to each other.

The reference number 5 relates to an alignment rod which is movable with respect to the blow moulding station in order to align the plastics material pre-forms 10 in their longitudinal direction. In this case a slide 12, with respect to which the alignment rod is movable in the Y direction, is arranged on the cover 17 here. The reference number 21 relates to a further retention means for this slide 12 of the alignment rod 5.

It is evident that specific regions of the alignment rod are both outside the clean room 20 and inside the clean room 20 during the blow moulding process. For this purpose it is possible for a protection device, such as a folding bellows which surrounds the alignment rod 5, to be provided outside the clean room 20 and above the slide 12 respectively, so that no region of the alignment rod 5 comes directly into contact with the external environment. The reference letter U designates the (non-sterile) environment of the clean room 20. The reference number 28 designates a carrier for carrying a base mould which likewise forms a component part of the blow mould. This carrier is likewise movable in the Y direction in this case.

The reference number 55 relates to a sterilization device which is preferably arranged in the interior of the clean room 20 here and which is used for the sterilization of the individual shaping stations or component parts of these shaping stations 8. This sterilization device 55 can act in this case upon the shaping stations 8 for example with hydrogen peroxide or another sterilization agent. In this case the sterilization device 55 can be arranged in a stationary manner and the shaping stations can move with respect to this sterilization device 55.

The blow moulds (not shown) are arranged inside the blow mould carrier 6. Expressed more precisely, in this case two blow mould carrier parts can be provided, which are pivotable with respect to each other and which hold a blow mould part in each case. As a result of this pivoting procedure the blow moulds can be opened for the introduction of plastics material pre-forms and for the removal of completed, blown containers. These blow mould carriers and blow moulds are in this case likewise arranged inside the clean room.

Figure 3:
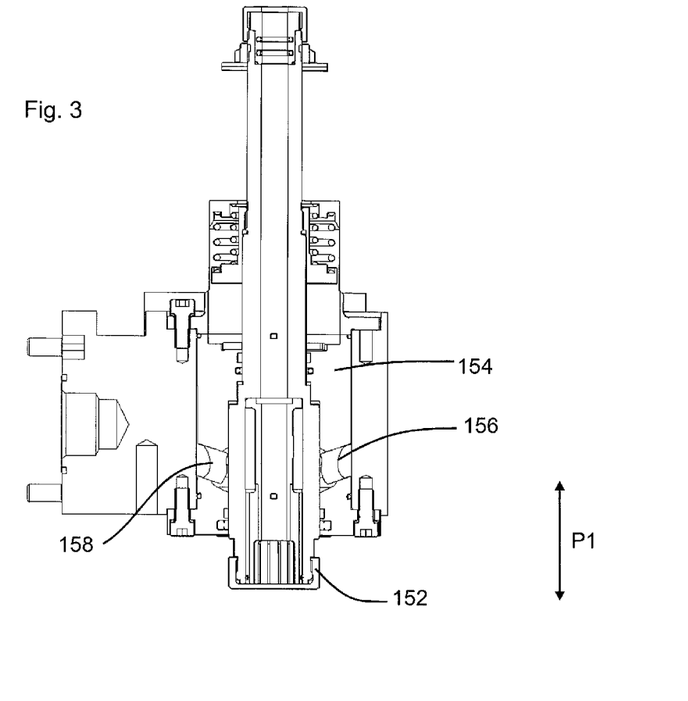
FIG. 3 is an illustration of a pressure stressing unit.

FIG. 3 shows an arrangement for acting upon plastics material pre-forms with blowing air. In this case a stressing device 152 is provided, which is capable of being laid against an aperture of a plastics material pre-form (not shown) in order to expand the latter. The reference number 156 (cf. also FIG. 2) designates a supply means for supplying blowing air and the reference number 158 designates a corresponding opening for the removal of the blowing air. The stressing device, which for example can have a blowing nozzle, is movable with respect to the plastics material pre-form in the direction P1, which is also at the same time a longitudinal direction of the plastics material pre-form. In this case it would be possible for the stressing device itself to remain stationary in the direction P1 and for the plastics material pre-form to move, but it is preferable for the stressing device 152 to perform a corresponding stroke.

The reference number 154 relates to a valve arrangement or a valve block. The individual valves of this valve arrangement can be designed in this case in the form of pneumatically actuated valves, in which case control air for actuating these valves can also be non-sterile, even if the valve arrangement is situated in its entirety in the clean room.

Figure 4A:
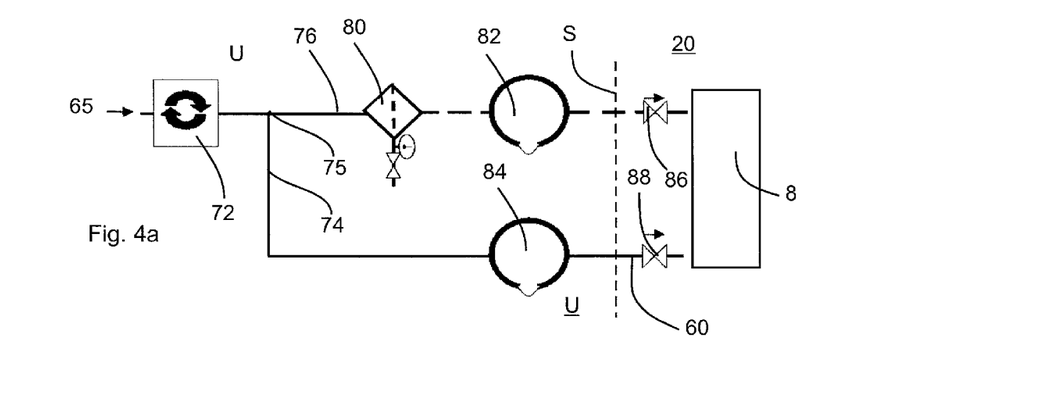
FIGS. 4a-b are two illustrations to show the supply of media.
Figure 4B:
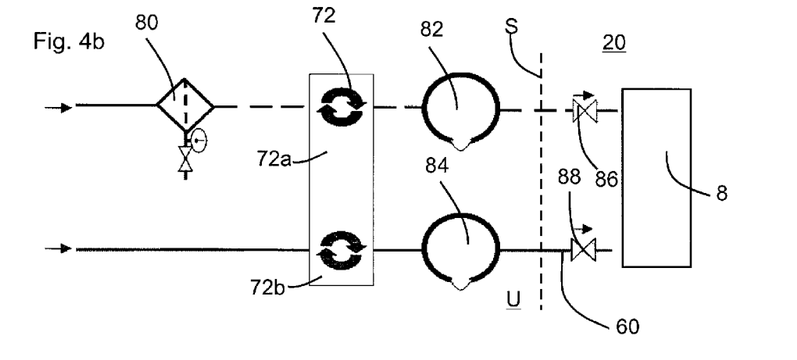

FIGS. 4a and 4b show two possible arrangements of a media supply means. In FIG. 4a the flowable medium, in particular process air, starting from a reservoir 65 first arrives in a rotary distributor 72. Downstream of this rotary distributor 72, i.e. in particular already in a rotating region of the blow moulding machine, the process air is divided into two supply lines 74 and 76 at a distribution point 75. The flowable medium flowing in the supply line 76 passes into a media sterilizing means 80 and is sterilized there (for example by means of sterile filters). After that, the medium sterilized in this way passes for example into an annular duct 82 in order to be conveyed from there to the individual shaping stations 8 for blowing the plastics material pre-forms. The reference letter S designates diagrammatically a boundary of the sterile room.

The second supply line 74 conveys non-sterile process air into a further annular duct 84. Starting from this annular duct, the non-sterile process air likewise passes into the sterile room 20 and from there likewise to the shaping stations 8. The reference numbers 86 and 88 relate to valves which are arranged in the supply lines.

In the case of the embodiment shown in FIG. 4b the process air is already divided upstream of the rotary distributors 72a, 72b, so that in this case sterile air is conveyed by way of the upper rotary distributor to the shaping station 8 and non-sterile air is conveyed by way of the lower rotary distributor. The reference number 80 in turn designates a media sterilizing means. The reference number 60 in FIG. 5 designates the supply device for supplying the control medium to the shaping station 8, which is arranged inside the sterile room 20.

Figure 5:
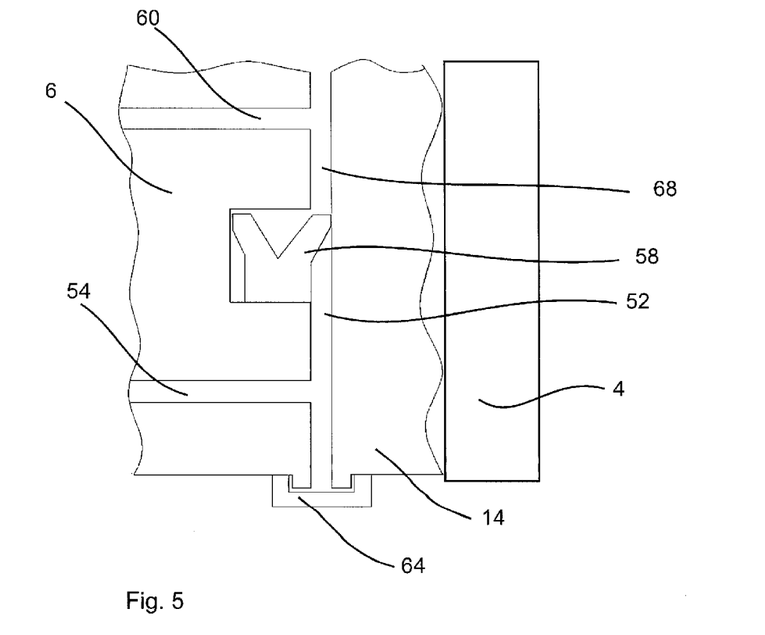
FIG. 5 is a diagrammatic illustration to show a pressure pad.

FIG. 5 is an approximate diagrammatic illustration to explain the invention. In this case a blow mould carrier 6 is illustrated on which a blow mould 4 (illustrated only diagrammatically) is arranged by way of a carrier shell 14. When blow moulds are changed, these are removed in this case from the carrier shell, but the carrier shell 14 remains on the blow mould carrier 6.

An air space 68, which here constitutes the pressure pad mentioned above, is formed between the blow mould carrier 6 and the carrier shell 14. As a result of the stressing of this air space 68 with compressed air the carrier shell 14 and the blow mould carrier 6 are spread apart and in working operation two mutually opposed blow mould parts (only one shown here) are compressed. The reference number 60 designates the supply device which in this case is a duct through which non-sterile air is conveyed into the air space. The mutually opposed faces of the carrier shell 14 and the blow mould carrier 6 are made flat here, but they can also be curved. The reference number 58 designates a sealing device which seals an air space 68 off from a chamber 52. This sealing device 58 can be designed in this case to be continuous around the air space 68. This air space forms the pressure pad here.

If non-sterile air nevertheless passes this sealing device 58, this air passes into the chamber 52 which, as mentioned above, is designed to be released from pressure. The non-sterile medium can be removed out of the sterile room 20 again by way of a removal line 54. The chamber 52 is likewise designed here to be continuous around the air space 68.

The reference number 64 designates a further sealing device which seals off the chamber 52 with respect to the sterile room 20 surrounding this chamber. In this way it is made possible for non-sterile medium passing into the chamber 52 to be removed only by way of the removal line 54 and for it not to pass out directly into the sterile room 20. This further sealing device is likewise designed to be continuous around the chamber 52 in this case.

Figure 6A:
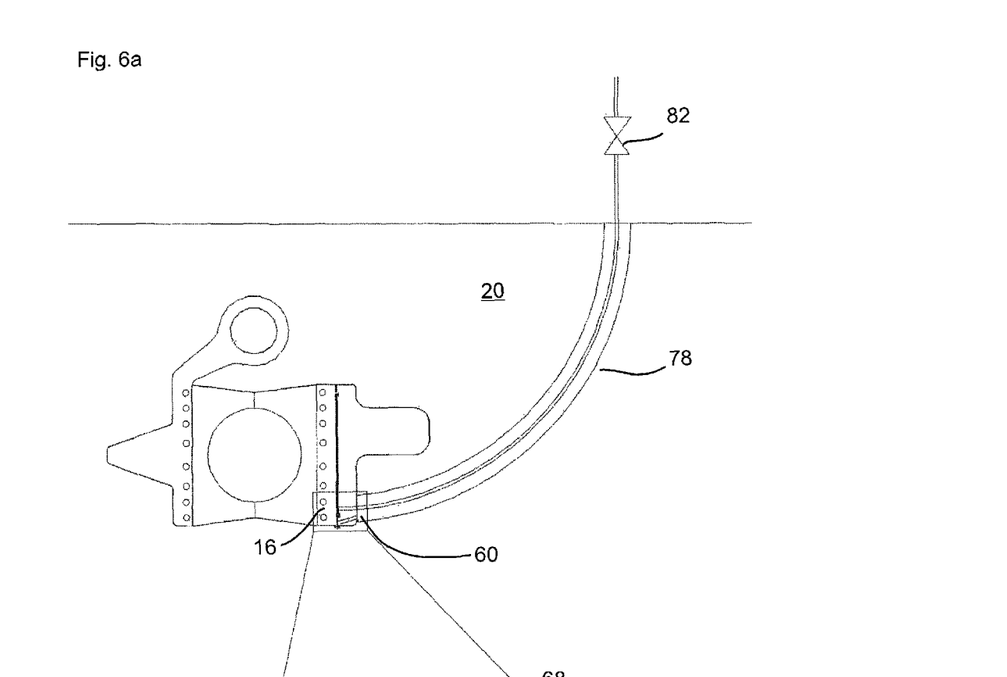
FIGS. 6a, b are two further illustrations to show a pressure pad.
Figure 6B:
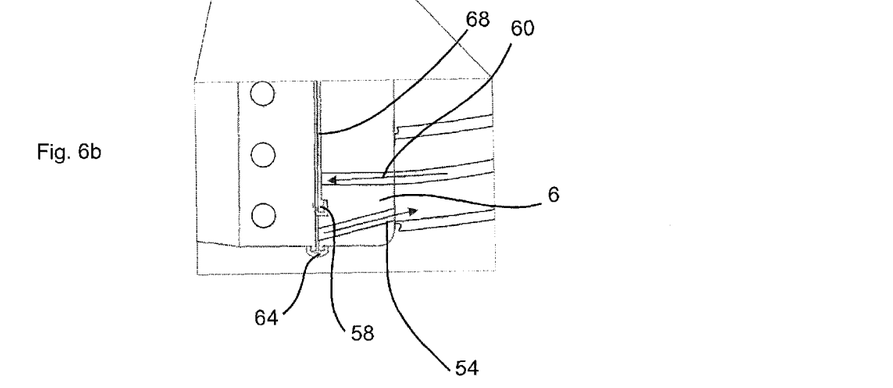

FIGS. 6a and 6b are two further illustrations to explain the pressure pad. The blow mould, which is arranged on the carrier shell 14, is again evident here. In this case bores 96, through which a tempering medium for tempering the blow mould can flow, are also evident here. The reference number 78 designates a hose-like member, in the interior of which the supply device 60 for supplying the pressure pad is arranged. In addition, air can be removed (past the supply device 60) out of the clean room 20 by way of this hose-like member 78 into the environment U. It is preferable for the hose-like member to be produced from a gas-tight material.

FIG. 6b is an enlarged illustration of the apparatus shown in FIG. 6a. In this case too the sealing device 58 is again evident, as well as the removal line for the removal of non-sterile air which has possibly escaped. The sealing device 64 is designed in this case in the form of a flexible member and it separates the sterile and the non-sterile zones of the apparatus. The region between the sealing device 58 and the sealing device 64 is designed in the form of a chamber with the pressure released.

The Applicants reserve the right to claim all the features disclosed in the application documents as being essential to the invention, insofar as they are novel either individually or in combination as compared with the prior art.

The invention claimed is:

1. An apparatus for the shaping of plastics material pre-forms into plastics material containers, comprising:
   a plurality of shaping stations which are arranged on a movable carrier, the shaping stations each having blow moulds which are used for receiving the plastics material pre-forms and inside which the plastics material pre-forms are capable of being shaped into the plastics material containers, and wherein the shaping stations have in each case, stressing devices which are movable relative to the plastics material pre-forms and which act upon the plastics material pre-forms arranged in the blow moulds with a sterile flowable medium to expand them
   a clean room, inside which the shaping stations are conveyed, wherein the clean room is arranged or demarcated from the environment by means of at least one wall;
   a valve arrangement configured for controlling the gaseous sterile medium supplied to the plastics material pre-forms;
   at least one first supply device configured for supplying a flowable control medium to at least one of said plurality of shaping stations, said at least one first supply device extending at least locally inside the clean room, wherein said at least one first supply device is sealed off from the clean room in such a way that the flowable control medium is also capable of being conveyed as a non-sterile medium to the shaping station; and at least one second supply device connected to said valve arrangement and configured for supplying the non-sterile medium to said valve arrangement to control actuation of said valve arrangement.

2. The apparatus according to claim 1, wherein a chamber, which adjoins a region capable of being acted upon with the non-sterile medium, is arranged inside the clean room.

3. The apparatus according to claim 2, wherein the chamber is designed in the form of a chamber with a pressure release.

4. The apparatus according to claim 2, wherein the chamber is sealed off from the clean room by means of a sealing device.

5. The apparatus according to claim 1, further comprising a removal line for removing the non-sterile control medium from the clean room.

6. The apparatus according to claim 5, wherein the removal line is connected in terms of flow to the chamber.

7. The apparatus according to claim 2, wherein a sealing device is arranged between the chamber and said at least one supply device.

8. The apparatus according to claim 1, further comprising a sterilization device for obtaining the sterile flowable medium.

9. An apparatus for the shaping of plastics material pre-forms into plastics material containers, comprising:
- a plurality of shaping stations which are arranged on a movable carrier, wherein the shaping stations each have blow moulds which are used for receiving the plastics material pre-forms and inside which the plastics material pre-forms are capable of being shaped into the plastics material containers, and wherein the plurality of shaping stations have in each case stressing devices which are movable relative to the plastics material pre-forms and which act upon the plastics material pre-forms arranged in the blow moulds with a sterile flowable medium to expand them;
- a clean room, inside which the shaping stations are conveyed, wherein this clean room is arranged or demarcated from the environment by means of at least one wall;
- an actuating valve; and
- at least one supply device connected to said actuating valve and configured for supplying a flowable control medium to at least one of the plurality of shaping stations, said at least one supply device extending at least locally inside the clean room, wherein said at least one supply device is sealed off from the clean room in such a way that the flowable control medium is also capable of being conveyed as a non-sterile medium to the shaping station, wherein said at least one supply device supplies the sterile medium to said plurality of shaping stations only for the expansion of the plastics material pre-forms in said plurality of shaping stations, and the non-sterile medium is a control medium for controlling the actuating valve.

10. An apparatus for the shaping of plastics material pre-forms into plastics material containers, comprising:
- a plurality of shaping stations which are arranged on a movable carrier, wherein the shaping stations each having blow moulds which are used for receiving the plastics material pre-forms and inside which the plastics material pre-forms are capable of being shaped into the plastics material containers, and wherein the plurality of shaping stations have in each case stressing devices which are movable relative to the plastics material pre-forms and which act upon the plastics material pre-forms arranged in the blow moulds with a sterile flowable medium to expand them;
- a clean room, inside which the shaping stations are conveyed, wherein this clean room is arranged or demarcated from the environment by means of at least one wall;
- at least one supply device configured for supplying a flowable control medium to at least one shaping station, said at least one supply device extending at least locally inside the clean room, wherein said at least one supply device is sealed off from the clean room in such a way that the flowable control medium is also capable of being conveyed as a non-sterile medium to the plurality of shaping stations; and
- a media line connected to a reservoir is divided into a first branch and a second branch, said first branch configured for supplying one of a sterile medium or a non-sterile medium to the plurality of shaping stations to expand the plastics material pre-forms and said second branch configured for supplying the non-sterile medium to the plurality of shaping stations, and wherein at least one of the first and second branches comprises an annular duct arranged between the reservoir and the shaping station.

11. The apparatus according to claim 3, wherein the non-sterile medium which has entered the chamber is removed from this chamber in a controlled manner out of the clean room.

12. The apparatus according to claim 1, wherein the valve arrangement has a plurality of valves which are provided for supplying individual pressure levels during the expansion procedure of the plastics material pre-forms.

13. The apparatus according to claim 1, wherein compressed air first is removed from a common reservoir and then divided in a branch and a portion of the air arrives non-sterile at a pressure pad or the valve arrangement, while another portion is conveyed through a sterile filter and is finally used for the expansion of the plastics material containers.

14. The apparatus according to claim 4, wherein a region between two sealing devices includes a pressure release.

15. The apparatus according to claim 2, wherein said at least one first supply device opens into a pre-set region and the chamber adjoins this region.

16. The apparatus according to claim 1, wherein the blow moulds are arranged in blow mould carriers and pressure application spaces capable of being acted upon with the control medium are arranged between the blow moulds and the blow mould carriers.

17. The apparatus according to claim 10, wherein the flowable control medium is process air that starts from the reservoir and first arrives in a rotary distributor, and wherein downstream of this rotary distributor, the process air is divided among the first and second branches at a distribution point.

18. The apparatus according to claim 10, wherein the flowable medium flows in one of the first and second branches into a media sterilizing means to be sterilized into a sterilized flowable medium, and after that, the sterilized flowable medium passes into the annular duct to be conveyed to the individual shaping stations for blowing the plastics material pre-forms.

* * * * *